(12) United States Patent
Tanaka (10) Patent No.: US 7,397,592 B2
(45) Date of Patent: Jul. 8, 2008

(54) BEAM IRRADIATION APPARATUS, BEAM IRRADIATION METHOD, AND METHOD FOR MANUFACTURING A THIN FILM TRANSISTOR

(75) Inventor: Koichiro Tanaka, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 82 days.

(21) Appl. No.: 10/827,431

(22) Filed: Apr. 20, 2004

(65) Prior Publication Data

US 2005/0036190 A1 Feb. 17, 2005

(30) Foreign Application Priority Data

Apr. 21, 2003 (JP) .............................. 2003-116408

(51) Int. Cl.
*G02B 26/08* (2006.01)

(52) U.S. Cl. .................. 359/212; 359/206; 359/208; 359/214; 359/215; 219/121.75

(58) Field of Classification Search .................. None
See application file for complete search history.

(56) References Cited

U.S. PATENT DOCUMENTS

| | | | |
|---|---|---|---|
| 4,330,363 A | 5/1982 | Biegesen et al. | |
| 4,504,354 A | 3/1985 | George et al. | |
| 5,365,875 A | 11/1994 | Asai et al. | |
| 5,712,191 A | 1/1998 | Nakajima et al. | |
| 5,835,249 A | 11/1998 | Yamada et al. | |
| 5,893,990 A | 4/1999 | Tanaka | |
| 5,896,233 A * | 4/1999 | Soda et al. | 359/635 |
| 6,849,825 B2 | 2/2005 | Tanaka | |
| 6,897,889 B2 | 5/2005 | Tanaka | |
| 7,125,761 B2 | 10/2006 | Tanaka | |
| 7,259,082 B2 | 8/2007 | Tanaka | |
| 2002/0031876 A1 | 3/2002 | Hara et al. | |
| 2003/0021307 A1* | 1/2003 | Yamazaki | 372/24 |
| 2003/0047732 A1 | 3/2003 | Yamazaki et al. | |

(Continued)

FOREIGN PATENT DOCUMENTS

JP 07-326769 12/1995

(Continued)

OTHER PUBLICATIONS

Office Action (Application No. 200410036922.4) dated Mar. 2, 2007.

*Primary Examiner*—James Phan
(74) *Attorney, Agent, or Firm*—Eric J. Robinson; Robinson Intellectual Property Law Office, P.C.

(57) ABSTRACT

A galvanometer mirror rotates in one direction when the galvanometer mirror is used. A spot can be scanned on an irradiated surface at a more constant speed by rotating the galvanometer mirror and by using the inertia. Moreover, it is preferable to make the galvanometer mirror heavy because the inertia becomes higher so that the spot is scanned at a more constant speed. In addition, in a polygon mirror of this invention, mirrors are arranged so as not to contact each other because a change time of the scanning position between the mirrors is provided. By moving the irradiated object with timing together when the laser light is not irradiated, the laser process can be performed efficiently.

26 Claims, 8 Drawing Sheets

U.S. PATENT DOCUMENTS

| | | |
|---|---|---|
| 2004/0074881 A1 | 4/2004 | Oishi |
| 2004/0106237 A1 | 6/2004 | Yamazaki |
| 2004/0112882 A1 | 6/2004 | Miyairi et al. |
| 2004/0135644 A1* | 7/2004 | Mizoguchi et al. .......... 331/154 |
| 2004/0209410 A1 | 10/2004 | Tanaka |
| 2005/0037552 A1 | 2/2005 | Yamazaki et al. |

FOREIGN PATENT DOCUMENTS

| | | |
|---|---|---|
| JP | 2003-045890 | 2/2003 |
| JP | 2003-059831 | 2/2003 |
| JP | 2003-086505 | 3/2003 |
| JP | 2003-086507 | 3/2003 |

* cited by examiner

FIG.6A display portion 4103
audio output portion 4102
chassis 4101

FIG.6B external interface 4105
stylus 4102
main body 4101
display portion 4103
operation button 4104

FIG.6C display portion 4202
main body 4201
operation button 4203

FIG.6D audio output portion 4302
antenna 4306
display portion 4304
operation switch 4305
main body 4301
audio input portion 4303

FIG.6E display portion 4401

BEAM IRRADIATION APPARATUS, BEAM IRRADIATION METHOD, AND METHOD FOR MANUFACTURING A THIN FILM TRANSISTOR

BACKGROUND OF THE INVENTION

1. Field of the Invention

The present invention relates to a beam irradiation apparatus and a beam irradiation method. Moreover, the present invention relates to a method for manufacturing a thin film transistor using the apparatus and the method.

2. Description of Related Art

In recent years, a research has been conducted concerning a thin film transistor having a channel-forming region in a poly-crystalline semiconductor film (hereinafter this thin film transistor is referred to as a poly-crystalline TFT) as a semiconductor element in a display device, an integrated circuit, or the like. With the development of the display device and the integrated circuit, further enhancement of the characteristic of the poly-crystalline TFT has been demanded.

Consequently, as one means to obtain the poly-crystalline TFT, a laser irradiation apparatus including a continuous wave laser and means for scanning a laser beam (also referred to as laser light) is used to crystallize the semiconductor film. (For example, refer to a patent document 1)

Moreover, a galvanometer mirror (refer to a patent document 2) or a polygon mirror (refer to a patent document 3) is often used as the means for scanning the laser light. This is because the galvanometer mirror and the polygon mirror can increase the scanning speed easily. This can reduce the burden on the apparatus.

Figure 7:
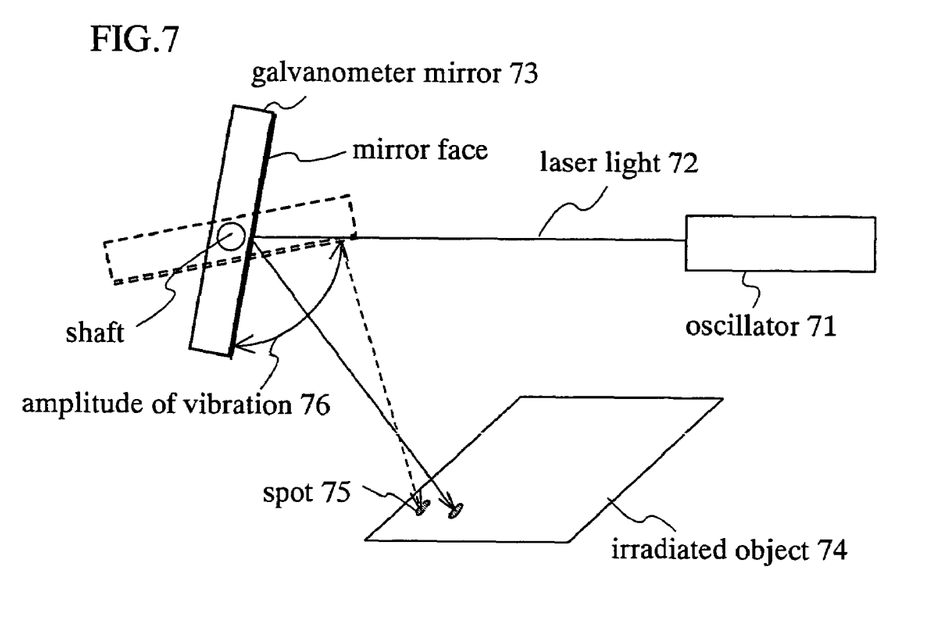
FIG. 7 is a drawing for showing the conventional laser irradiation method.

FIG. 7 shows a structure of a conventional galvanometer mirror. Laser light 72 emitted from a laser light oscillator 71 is reflected by a galvanometer mirror 73 and a spot (irradiated region) 75 is formed on an irradiated object 74. The laser irradiation process is performed in such a way that the spot 75 is scanned on the irradiated object by vibrating the galvanometer mirror 73 at amplitude of vibration 76. The laser light is irradiated to the irradiated object in accordance with the amplitude of vibration of the galvanometer mirror shown in FIG. 7.

In addition, in the case of the polygon mirror, the laser light is irradiated to the irradiated object by rotating a plurality of mirrors provided so as to contact.

Patent document 1
Japanese Patent Laid-Open No. 2003-86505

Patent document 2
Japanese Patent Laid-Open No. 2003-86507

Patent document 3
Japanese Patent Laid-Open No. 2003-45890

SUMMARY OF THE INVENTION

In particular, when the mass production using a large substrate is considered, it is emphasized to obtain the crystalline semiconductor film that is uniform over a wide range efficiently. Consequently, the scanning means such as the galvanometer mirror or the polygon mirror is often employed which can easily increase the scanning speed because of the lightness in weight. In addition, the burden on the laser irradiation apparatus can be reduced by these scanning means.

However, the use of the above scanning means might cause a problem that the scanning speed and the irradiated state are not uniform in the end portions of the irradiated surface where the scanning starts and the scanning ends. In addition, the vibration of the galvanometer mirror might make the scanning width meander.

For example, when the laser irradiation is performed to the semiconductor film by reflecting the laser light on the galvanometer mirror doing the pendulum movement (vibration), the speed decreases toward the point where the direction of the pendulum movement changes (the point is also referred to as a peak of the pendulum movement or a point where the galvanometer mirror stops) and at last the speed becomes zero for a moment. After that, the speed increases gradually while changing the moving direction. Although the galvanometer mirror can increase or decrease the scanning speed in a short time, the present inventor recognized that such inhomogeneous laser irradiation, which is the irradiation unevenness, leads to a problem as higher-quality and more uniform crystallization of the semiconductor film is required. Since the energy was irradiated excessively to the irradiated object due to such irradiation unevenness, there was concern such that the irradiation unevenness might cause the peeling of the amorphous semiconductor film. When the film is peeled, it was concerned that even the normal film is rough by the spattered semiconductor film. Thus, the present inventor recognized that inhomogeneous scanning speed of the laser light is a problem in the field of semiconductor where high-quality and uniform crystallization of the semiconductor film is required.

In addition, in the case of using a polygon mirror doing a rotational movement in which a plurality of mirrors is connected continuously, the irradiation position differed slightly depending on the incidence angle of the laser light reflected by each mirror. In particular, the difference of the incidence angle at the boundary between the mirrors caused the difference in the positions where the scanning starts and the scanning ends and further caused the inhomogeneous laser irradiation process. In addition, since the irradiation position also differs in a direction perpendicular to the scanning direction, this also caused the inhomogeneous laser irradiation process. The present inventor recognized that the inhomogeneous laser light irradiation becomes a problem when higher-quality and more uniform crystallinity of semiconductor film is obtained.

Consequently, it is an object of the present invention to provide a beam irradiation apparatus and a beam irradiation method that homogenize the scanning speed of the scanning means such as the galvanometer mirror or that control the scanning position accurately. In addition, it is an object of the present invention to provide uniform laser annealing (including crystallization and activation) to a thin film transistor (hereinafter referred to as a TFT) or the like using the above beam irradiation apparatus and the above beam irradiation method.

In the present invention made in view of the above problems, when scanning (deflecting) means having singular specular body (also referred to as a mirror) is used, the scanning means rotate in one direction. It is noted that the specular body has a plane surface or a curved surface. Hereinafter, the galvanometer mirror is taken as an example of such a specular body.

The galvanometer mirror of the present invention rotates stably because it rotates in one direction, and the vibration of the mirror due to the change in acceleration is eliminated. When the galvanometer mirror is in the position where the laser light is not irradiated, the irradiated object may move in a Y-axis direction, which is perpendicular to an X-axis direction assuming that the X-axis direction is the moving direction of the spot by the galvanometer mirror. Then, the laser light can be scanned in XY-axes directions, and therefore the laser irradiation process can be performed to the large substrate. On this occasion, since the galvanometer mirror rotates in one direction, the laser light is scanned in only one direction on the X-axis of the irradiated object.

Figure 1:
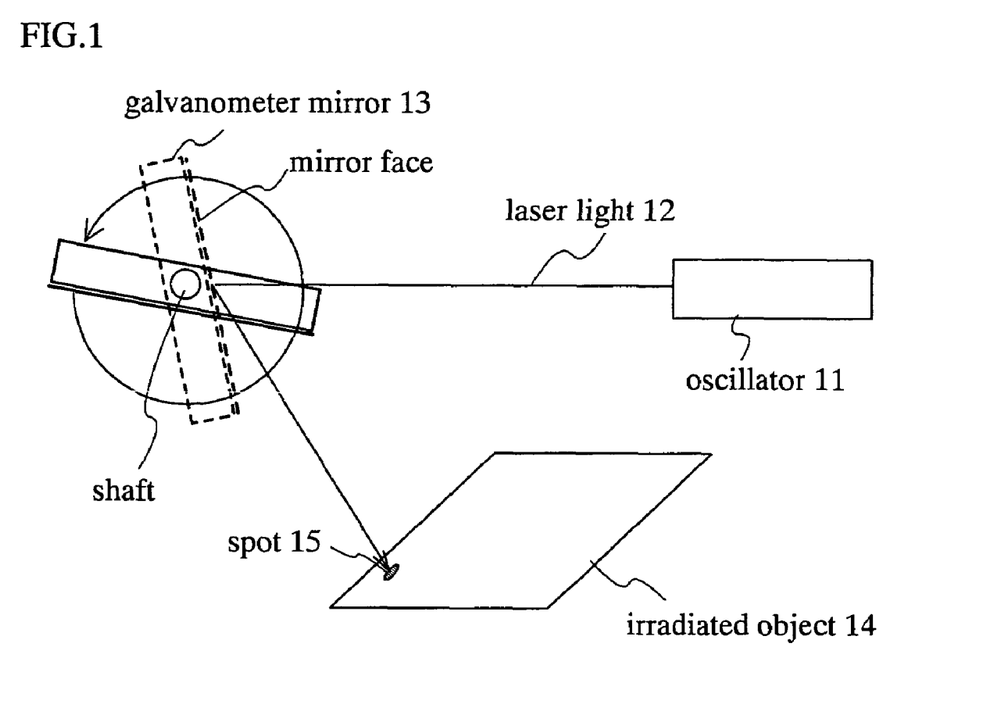
FIG. 1 is a drawing for showing the laser irradiation apparatus of the present invention.

Specifically, a mirror surface rotates on the shaft arranged in a galvanometer mirror 13 as its center as shown in FIG. 1. The shaft has a supporting bar in one end or in both ends and has an apparatus for controlling the rotation. It is preferable that the supporting bar is provided in the both ends because the rotation axis is more stable. Laser light 12 emitted from an oscillator 11 is reflected on a galvanometer mirror 13, and a spot 15 is formed on an irradiated object 14. The spot moves by rotating such a galvanometer mirror 13, and thus the laser irradiation process is performed to the irradiated object.

As thus described, the spot can be scanned at more constant speed on the irradiated surface by rotating the galvanometer mirror and by using inertia. In addition, since the heavier galvanometer mirror produces the higher inertia, it is preferable that the galvanometer mirror is heavy so that the spot is scanned at much more constant speed. Furthermore, since the galvanometer mirror can have a simple and compact structure, the galvanometer mirror is preferable when it is installed in the laser irradiation apparatus.

Figure 2:
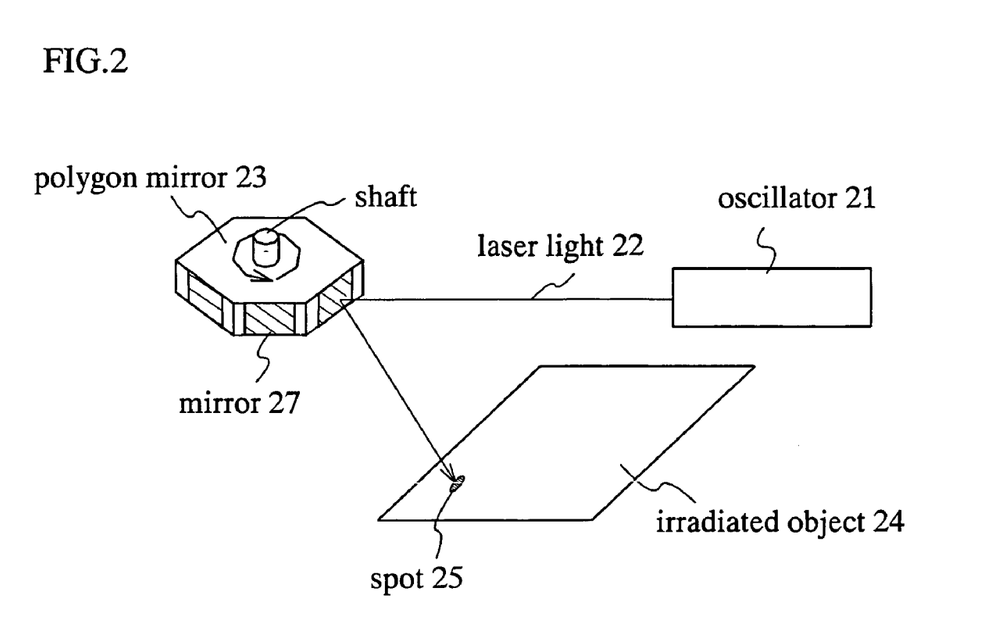
FIG. 2 is a drawing for showing the laser irradiation apparatus of the present invention.

As another scanning means, scanning means having a plurality of specular bodies (this scanning means is referred to as a polygon mirror for simplicity) is given. A polygon mirror of the present invention has a plurality of mirrors 27 as shown in FIG. 2. In order to provide time for scanning in the Y-axis direction in accordance with mirror interval, the plurality of mirrors is arranged so that they do not contact each other, which means the side surface of the mirror does not contact each other. The laser light 22 is incident into the polygon mirror 23 that rotates on the shaft as its center, and the spot 25 is scanned on the irradiated object 24. As a result, there are alternately times when the irradiated object 24 is irradiated by the spot 25 and times when it is not irradiated by the spot 25. In other words, when the laser light is incident into the boundary between the mirrors, the laser light is not irradiated to the irradiated object. The laser irradiation process can be performed efficiently by moving the irradiated object when the laser light is not irradiated thereto. In other words, when the spot is scanned in the X-axis direction by the polygon mirror and when the spot disappears (when the laser light is not irradiated), the irradiated object is moved in the Y-axis direction. On this occasion, since the direction in which the laser light is reflected is different little by little depending on each mirror in the polygon mirror, the irradiated position and the like are compensated by changing the travel amount of the irradiated object in the Y-axis direction. Accordingly, since it is no longer necessary to set a compensating lens between the polygon mirror and the irradiated object, the laser irradiation apparatus can be simplified and be preferable.

According to such scanning means of the present invention, uniform laser irradiation can be performed to the irradiated object. When the semiconductor film is employed as the irradiated object, it is possible to form the poly-crystalline TFT having uniform crystallinity and uniform electrical characteristic.

It is noted that the present invention can use a continuously output energy beam (hereinafter referred to as a CW beam). As the CW beam, a solid-state laser may be used. For example, a beam emitted from a $YVO_4$ laser, a YAG laser, a YLF laser, a $YAlO_3$ laser, an Ar laser, or the like can be applied. In addition, a harmonic of these lasers may be also employed. When the laser is employed as the light source, the CW beam is referred to as a CW laser.

It is noted that although the laser beam may have any shape, it is preferable that the laser beam is shaped to be linear by transmitting through an optical system. The term "linear" herein used does not mean a line in a strict sense but means a rectangle having a large aspect ratio (or an oblong shape). For example, the linear indicates the rectangle having an aspect ratio of 10 or more (preferably in the range of 100 to 10000). Specifically, the spot diameter of the linear laser beam has a length ranging from 150 to 1000 μm in the major axis and a length ranging from 5 to 20 μm in the minor axis. With the laser beam shaped into linear, the process can be performed at high throughput.

As above, the present invention can remove inhomogeneity of the irradiation of the laser beam caused by the operation of the scanning means and can provide a poly-crystalline TFT having uniform crystallinity and uniform electrical characteristic. Even though the irradiated object has a large size, the poly-crystalline TFT having uniform characteristic over a wide range can be formed, and therefore it is possible to improve the mass productivity of the display device and the integrated circuit.

ADVANTAGEOUS EFFECT OF THE INVENTION

Uniform laser irradiation can be performed to the irradiated object according to the present invention. When the semiconductor film is used as the irradiated object, the poly-crystalline TFT having uniform crystallinity and uniform electric characteristic can be formed. Moreover, since the beam spot can be scanned at a constant speed on the irradiated object and since the scanning position of the spot can be controlled accurately, uniform laser annealing can be performed to the semiconductor film. Furthermore, when the large substrate is used, the present invention is preferable because the laser annealing can be performed very efficiently.

In addition, when the polygon mirror of the present invention is used, much more uniform laser irradiation can be performed by setting the travel amount of the XY stage mirror by mirror.

EMBODIMENT MODES OF THE INVENTION

Embodiment modes of the present invention are hereinafter explained based on drawings. However, since the present invention can be embodied in many different modes, it is easily understood by those skilled in the art that the modes and the details can be changed and modified in various ways unless such changes and modifications depart from the scope and the content of the present invention hereinafter defined. Thus, the present invention is not limited to the description of the embodiment modes. In addition, the same reference numeral is given to the same part or the part having the similar function throughout the all drawings for explaining the embodiment modes, and the explanation to such a part shall not be repeated.

Embodiment Mode 1

The present embodiment mode explains the case where a rotating galvanometer mirror is used as the scanning means and a semiconductor film is used as the irradiated object and where a poly-crystalline TFT is formed by crystallizing the semiconductor film.

Figure 3:
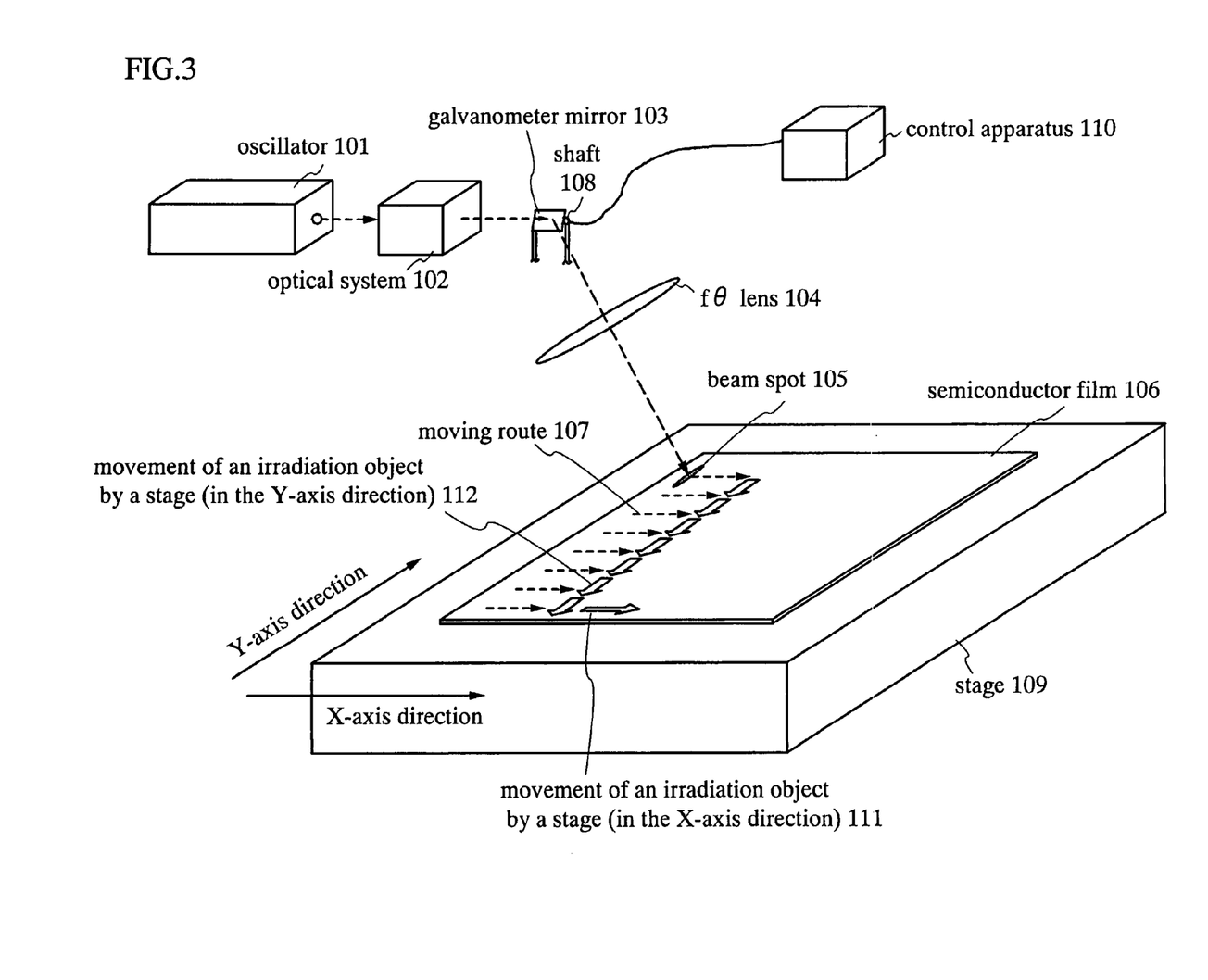
FIG. 3 is a drawing for showing the laser irradiation method of the present invention.

FIG. 3 shows a laser irradiation apparatus including an oscillator 101 for emitting a CW laser (also referred to as a continuous wave laser), an optical system 102 for shaping a laser beam emitted from the oscillator into linear, a galvanometer mirror for scanning the linear laser beam on a semiconductor film, a shaft 108 for rotating the galvanometer mirror, a control apparatus 110 for controlling the shaft and the rotation of the galvanometer mirror, and an fθ lens 104 for making the shape of the laser beam on the irradiated surface constant. The laser beam emitted from the oscillator is incident into the optical system so that its shape becomes linear laser beam (hereinafter this beam is referred to as a linear beam). Then the linear beam is incident into the rotating galvanometer mirror and is reflected thereby. After that, the linear beam is irradiated to the irradiated object through the fθ lens. The irradiation of the laser beam is controlled by the structure having the above function.

For example, the optical system 102 arranges a planoconcave lens having a focal length of 50 mm, a planoconvex lens having a focal length of 200 mm, a planoconvex cylindrical lens having a focal length of 250 mm behind the planoconvex lens, and a planoconcave cylindrical lens having a focal length of 100 mm behind the planoconvex cylindrical lens. It is noted that the direction of curvature of the planoconcave cylindrical lens is the same as that of the planoconvex cylindrical lens. The laser beam is shaped into the linear beam by transmitting through the optical system and by being condensed repeatedly. In addition, a lens except for the above lenses may be arranged so that a spot of the laser beam on the irradiated surface (also referred to as a beam spot) has a desired shape (for example linear).

The control apparatus 110 for controlling so that the galvanometer mirror 103 rotates in one direction is provided. A motor or the like can be used as the means for rotating the galvanometer mirror. Then, in order to make the rotation speed more constant using the inertia, the weight of the galvanometer mirror may be made heavy.

The laser beam scanned by the galvanometer mirror transmits through the fθ lens 104 so that the laser beam has constant shape on the semiconductor film. Then, the laser beam is incident into the semiconductor film and is scanned along a moving route 107. It is noted that when the galvanometer mirror rotates in one direction, the moving route 107 is only one direction. When the rotating direction changes, the direction of the moving route 107 becomes the opposite of the one direction.

In such laser irradiation, when the laser beam is not irradiated to the semiconductor film, which means when the beam spot 105 is not on the semiconductor film 106, the stage 109 moves in the Y-axis direction (indicated by an arrow 112) to change the scanning position of the spot 105. By repeating such an operation, it is possible to perform the laser irradiation, which is the laser annealing, uniformly in Y-axis direction. Subsequently, in the case where the next line in the semiconductor film is irradiated, the irradiated object moves in the X-axis direction (indicated by an arrow 111), and then the same process is performed. In addition, on this occasion, it is necessary that the beam spot is scanned in such a way that the rotation of the galvanometer mirror and the moving of the stage in the Y-axis direction are synchronized.

Since the semiconductor film is not irradiated when a scanning speed of the laser beam is not uniform according to the above irradiation method, it is possible to obtain the poly-crystalline TFT having more uniform crystallinity and more uniform electrical characteristic.

After that, the process that is necessary for forming the TFT is performed as appropriate, and thus an active matrix substrate in which a plurality of poly-crystalline TFTs is formed can be provided. When the poly-crystalline TFT is formed using a large substrate, multiple panels can be obtained and therefore the manufacturing cost can be reduced. It is noted that the laser irradiation method of the present invention can be applied to the laser annealing including crystallization and activation process of a semiconductor film.

Embodiment Mode 2

The present embodiment mode explains a case where the mass productivity of the thin film transistor is enhanced by performing a laser process to a semiconductor film formed over a substrate using a plurality of laser oscillators. It is noted that a polygon mirror is used as the scanning means in the explanation.

Figure 4A:
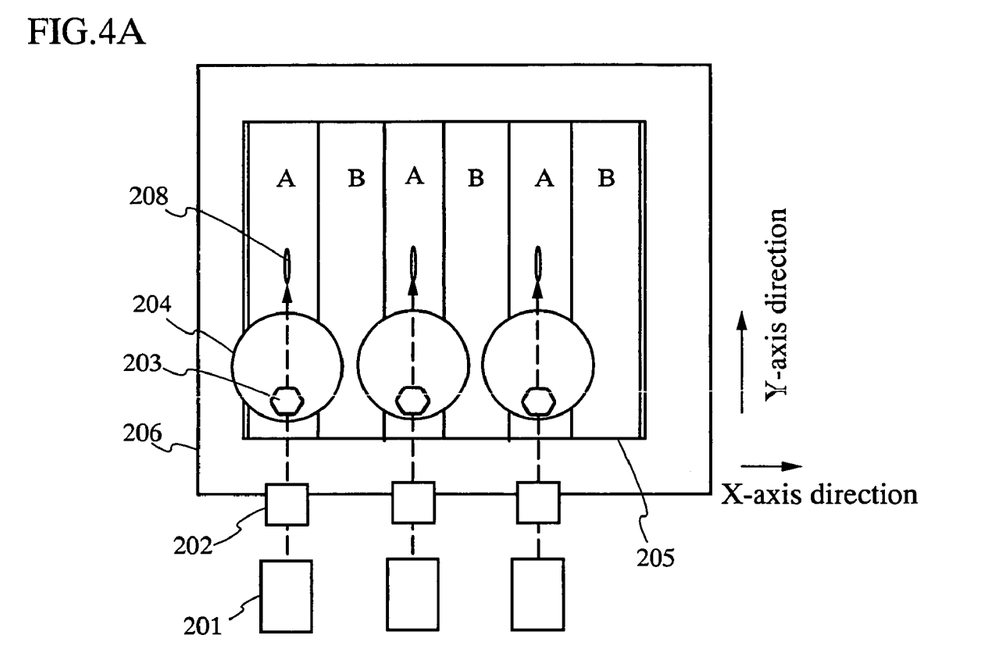
FIGS. 4A-4B are drawings showing the laser irradiation method of the present invention.
Figure 4B:
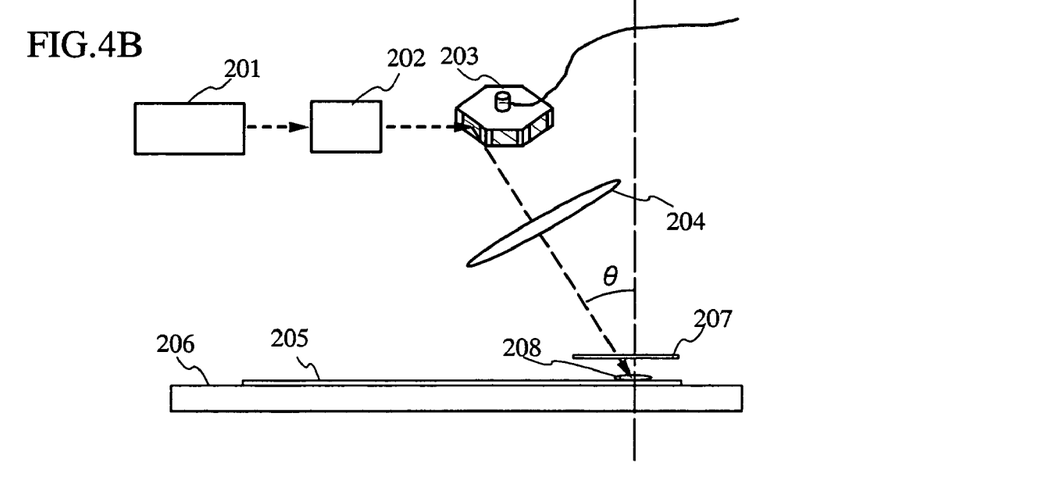

FIG. 4 shows an example where three CW laser oscillators 201, three telecentric fθ lenses 204, and three polygon mirrors 203 are used to perform the laser annealing to a semiconductor film 205 formed over a large substrate having a size of 1500 mm×1800 mm. It is noted that FIG. 4(A) is a top view, and (B) is a side view.

An oxide film (a silicon oxide film such as SiON or $SiO_2$) is formed on a substrate as a base film and then a semiconductor film is formed thereon sequentially. The semiconductor film may be formed of a silicon-based material by a CVD method, a sputtering method, or the like. In this embodiment mode, an amorphous silicon film is formed by the CVD method using silane gas. In some film-forming methods, the semiconductor film may contain too much density of hydrogen to resist the laser annealing. Therefore, in order to increase the resistivity probability of the semiconductor film against the laser annealing, the density of hydrogen in the semiconductor film is preferably made on the order of $10^{20}$/$cm^3$ or less. Therefore, when the film contains hydrogen more than the above value at the time of completion of the film-forming, it is preferable to dehydrogenate by the thermal annealing at temperatures ranging from approximately 400 to 500° C. for about one hour. The laser annealing is performed to the semiconductor film formed thus. It is noted that the semiconductor film may be patterned into the fixed shape before the laser annealing.

For example, the second harmonic (wavelength 532 nm) of an LD-pumped CW Nd: $YVO_4$ laser is used as the laser oscillator 201. The laser oscillator 201 has an output power of 10 W and is TEM00 mode. The laser beam spot has a diameter φ of 2.3 mm and has a divergence angle of 0.35 mrad.

Since this wavelength is transparent to the amorphous silicon film and the substrate, it may be necessary to devise a method for suppressing the inhomogeneous laser annealing due to the interference. In that case, the laser beam is preferably made incident into the semiconductor film 205 at an angle except 0°, for example. On this occasion, the appropriate incidence angle depends on the shape or the size of the beam spot. The direction to which the laser spot 208 is extended (corresponding to the major axis) is the Y-axis direction in FIG. 4. Although it may be extended to another direction according to the purpose, it is preferable to extend it in the Y-axis direction in order to maximize the throughput in this embodiment mode. For example, when the laser beam spot shaped into a linear ellipse having a size of 400 μm in its major axis and 20 μm in its minor axis on the semiconductor film 205 is set so that the major axis thereof is included in the incidence plane, the appropriate incidence angle θ is approximately 20°.

For example, the optical system 202 includes a planoconcave lens having a focal length of 50 mm, a planoconvex lens having a focal length of 200 mm positioned 145 mm apart, a planoconvex cylindrical lens having a focal length of 250 mm positioned 140 mm behind the planoconvex lens, and a planoconcave cylindrical lens having a focal length of 100 mm positioned 145 mm behind the planoconvex cylindrical lens. It is noted that the direction of curvature of the planoconvex cylindrical lens is the same as that of the planoconcave cylindrical lens. Moreover, a polygon mirror 203 is arranged approximately 250 mm behind the planoconcave cylindrical lens and a telecentric fθ lens 204 is arranged in accordance with the specifications of these lenses. The telecentric fθ lens 204 has a focal length of approximately 300 mm and has a diameter φ of 120 mm.

In the laser irradiation apparatus having the optical system as above, the beam spot 208 extended to be linear on the semiconductor film 205 is scanned on the semiconductor film 205 at a speed of 500 mm/s by the polygon mirror 203. Since the polygon mirror of the present invention doesn't contact each other at the boundary, there is time for changing the scanning position on the semiconductor film.

When the irradiated region of the laser beam scanned by one mirror in the polygon mirror has a width of 100 mm, the beam spot 208 is scanned in such a way that after the beam spot 208 is scanned 100 mm by the polygon mirror in the X-axis direction, an XY stage 206 is moved 200 μm (the width of the crystallized region in a direction perpendicular to the scanning direction of the beam spot determined by the size of the beam spot) in the Y-axis direction, and then the beam spot is scanned on the semiconductor film 205 by the polygon mirror 203.

In particular, when the polygon mirror is used, it is preferable to adjust the travel amount of the stage mirror by mirror. This is because the polygon mirror has a plurality of mirrors so that the angle to which the beam is reflected may be different in each mirror. This method is explained in detail in an embodiment mode 3. In the laser irradiation as above, the region in the semiconductor film not irradiated by the laser beam depends on the laser beam or the scanning means such as the polygon mirror, and the travel amount of the stage may be set appropriately in every embodiment.

The laser annealing is performed to a region A in the figure by repeating the above. The number of regions A conforms to the number of laser oscillators and the interval between the regions A is set to 100 mm appropriately, for example. After the laser annealing to the region A, the semiconductor film 205 is moved by an XY stage 206 to the position where a region B can be annealed. Then, the laser annealing is performed to the region B at a constant width of 100 mm in the same way. A series of these operations can perform the laser annealing to the whole surface of the semiconductor film 205.

Of course, it is not necessary to perform the laser annealing all over the semiconductor film 205. It is preferable to perform the laser annealing only to the necessary part thereof because the processing time can be shortened. In such a case, it is necessary to provide a positioning mechanism and the like precisely and a practitioner may calculate the necessary precision to determine its structure appropriately.

In the present embodiment mode, a telecentric fθ lens is used so that the laser beam is incident into the semiconductor film at a constant incidence angle. This provides the uniformity of the laser annealing. When the uniformity is not required, an fθ lens may be used alternatively. In this embodiment mode, a plurality of telecentric fθ lenses 204 is arranged at intervals. Therefore, the semiconductor film can be irradiated with a plurality of laser beams simultaneously without the adjacent telecentric fθ lenses interfering with each other.

The semiconductor film is thus crystallized. Subsequently, after the semiconductor film is patterned into the fixed shape as needed, a gate insulating film, a gate electrode, and an impurity region are formed, and then activation is performed. The laser irradiation apparatus and the laser irradiation method of the present invention can be also applied to activate the semiconductor film. Then an interlayer insulating film, a source wiring, a drain wiring, a pixel electrode, and the like are formed, and thus an active matrix substrate having a plurality of thin film transistors is formed. In addition, the active matrix substrate can be used to form a liquid crystal display device, a light-emitting device, another display device having a display portion, or a semiconductor integrated circuit.

As above, the present invention can provide high throughput compared with the case in which only one laser oscillator is employed. Therefore, the present invention is suitable to the laser annealing of the semiconductor film formed over a large substrate. As a result, the mass productivity of the thin film transistor can be enhanced.

Although the present embodiment uses a plurality of laser oscillators, a laser beam emitted from one laser oscillator may be divided by a mirror or the like to form a plurality of spots.

Moreover, although the present embodiment mode uses the polygon mirror as the scanning means, the galvanometer mirror having the rotating function can be used.

Embodiment Mode 3

Figure 8A:
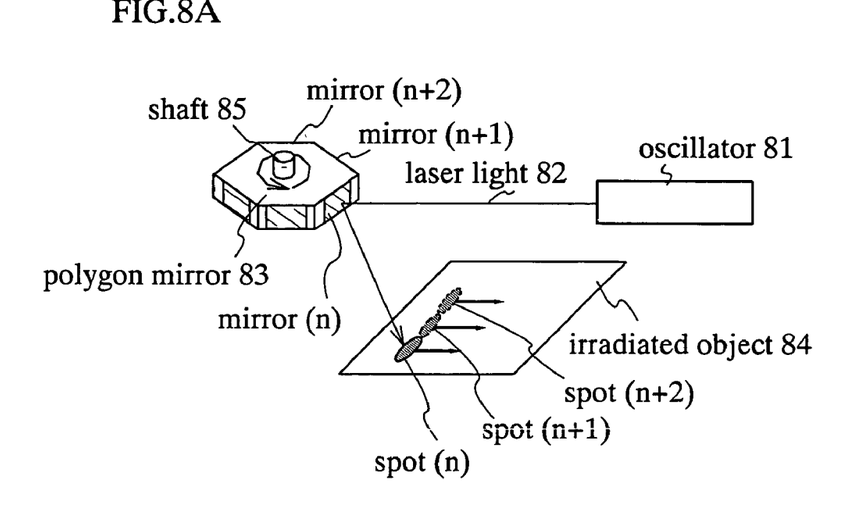
FIGS. 8A-8B are drawings showing the laser irradiation apparatus of the present invention.
Figure 8B:
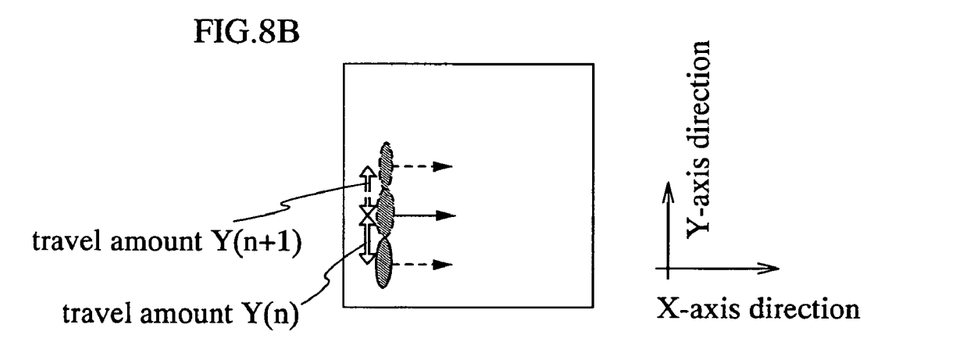

The present embodiment mode explains the timing for moving the XY stage and the polygon mirror with reference to FIG. 8. It is noted that the polygon mirror has N number of specular bodies (1≦n≦N: n is an integer number).

In the scanning means such as the polygon mirror having a plurality of mirrors, the reflection angle may be different mirror by mirror. Although the XY stage moves at a constant interval under this circumstance, the interval between the scanning positions is no longer constant and therefore uniform laser irradiation cannot be performed. Consequently, as shown in the present embodiment mode, the distance between the mirrors in the polygon mirror, which means the travel amount of the XY stage when the laser beam is not irradiated, is set mirror by mirror. Uniform laser irradiation is performed by reflecting the laser light sequentially on the mirror.

In other words, as shown in FIG. 8(A), in the optical system where a polygon mirror 83 scans laser light 82 emitted from an oscillator 81, a spot (n) formed by a mirror (n), a spot (n+1), a spot (n+2) . . . are scanned sequentially in one direction of the X-axis direction by rotating the polygon mirror 83 on a shaft 85 as a center, and thus the laser irradiation process is performed to the surface of the irradiated object 84. As shown in FIG. 8(B), when the travel amount of the XY stage moving from the mirror (n) to the next mirror is expressed with Y(n), it is preferable that Y(1), Y(2), . . . Y(N) are set respectively. It is noted that N is the number of mirrors.

In order to set the travel amount Y(n), Y(n+1). . . of the XY stage, each of the plurality of mirrors is numbered and the mirror is scanned once, for example. After a reflection angle of each mirror is understood, the travel amount of the stage is determined based on this. Each travel amount may be input into the control apparatus of the XY stage.

Thus, when the travel amount of the XY stage in X-axis direction and the timing for moving the XY stage in X-axis direction are set in accordance with the reflection angle of each mirror in the polygon mirror and with the travel amount of the irradiated object between the mirrors, more uniform laser irradiation process can be performed.

It is noted that this embodiment mode can be also applied to the polygon mirror in which the mirrors are provided so as to contact. In other words, uniform laser irradiation can be performed by adjusting the travel amount of the XY stage when the XY stage moves at the boundary between the mirrors provided so as to contact each other. In addition, when the time for moving the stage in Y-axis direction is necessary, the means for blocking the laser beam in one end, in the other end, or in both ends of the scanning of the laser beam may be provided.

Embodiment Mode 4

Figure 5A:
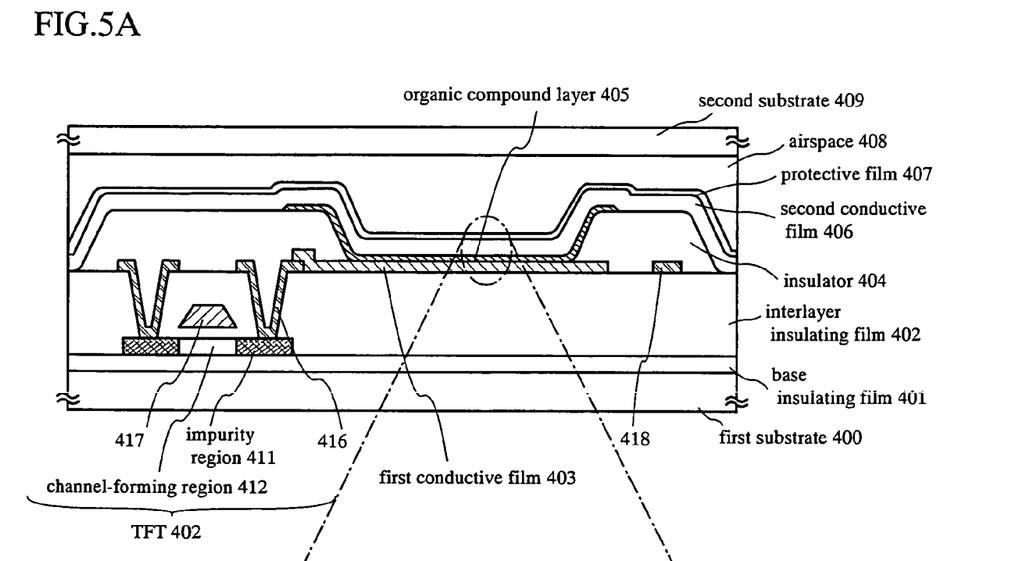
FIGS. 5A-5B are drawings showing the light-emitting device formed using the laser irradiation method of the present invention.
Figure 5B:
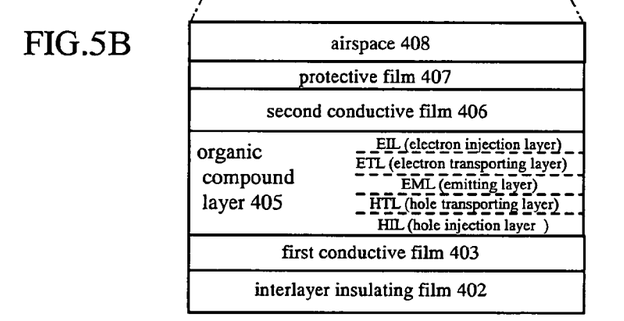

The present embodiment mode explains a light-emitting device manufactured using the active matrix substrate with reference to FIG. 5.

FIG. 5(A) is a cross-sectional view of a light-emitting device, specifically an EL module. FIG. 5(B) is an enlarged view of the laminated-layer structure of the light-emitting element (having an organic compound layer (also referred to as an EL layer), a first conductive film, and a second conductive film) of the EL module.

FIG. 5(A) shows a first substrate 400, a base insulating film 401, a TFT 422 formed by the laser annealing with the use of the laser irradiation apparatus of the present invention, a first conductive film (electrode) 403, an insulator (also referred to as a partition wall, a barrier, an embankment, or a bank) 404, an organic compound layer 405, a second conductive film (electrode) 406, a protective film 407, an airspace 408, and a second substrate 409.

A glass substrate, a quartz substrate, a silicon substrate, a plastic substrate, a metal substrate, a stainless substrate, a flexible substrate, or the like can be used as the first substrate and the second substrate. The flexible substrate is a film-like substrate formed of PET, PES, PEN, acryl, or the like, and when the flexible substrate is used to manufacture a light emitting device, weight saving is anticipated. It is desirable to form a barrier layer such as an aluminum film (AlON, AlN, AlO, or the like), a carbon film (DLC or the like), or SiN on a surface of the flexible substrate or on both the surface and the rear surface thereof in a single layer or in multi-layers because the durability and the resistivity against gas can be improved.

In addition, either the first conductive film or the second conductive film is formed of a light-transmitting conductive film, for example ITO, according to whether the light from the organic compound is emitted upward or downward. When the light is emitted to both upward and downward, both the first conductive film and the second conductive film are formed of the light-transmitting conductive film.

The TFT 422 (p-channel TFT in this embodiment mode) provided over the first substrate 400 is an element for controlling the current flowing through the organic compound layer 405. The TFT 422 has an impurity region 411 functioning as a drain region (or a source region depending on the polarity), a channel-forming region 412, and a gate electrode 417 provided over the channel-forming region. Furthermore, the TFT 422 has a drain electrode (or a source electrode) 416, which is connected to a drain region (or a source region) for connecting the impurity region 411 and the first conductive film 403 electrically. Moreover, a wiring 418 such as a power supplying line or a source wiring can be formed simultaneously in the same process for forming the drain electrode 416.

A base insulating film 401 (herein the base insulating film is formed of an insulating nitride film as a lower layer and an insulating oxide film as an upper layer) is formed over the first substrate 400 and a gate insulating film is provided between the gate electrode 417 and the semiconductor film. In addition, an interlayer insulating film 402 is formed of an organic material or an inorganic material. Although it is not illustrated in the figure, one TFT or a plurality of TFTs (n-channel TFT or p-channel TFT) is further provided in one pixel. In addition, although this embodiment mode showed the TFT having one channel-forming region 412, there is no particular limitation, and the TFT may have a plurality of channels, which is called a multi-channel TFT.

In addition, although this embodiment mode explained a top-gate type TFT as the example, the present invention can be applied regardless of the TFT structure. For example, the present invention can be applied to a bottom-gate type (inversely staggered) TFT and a staggered TFT.

In addition, the first conductive film 403 becomes an anode (or a cathode) of the light-emitting element. When the first conductive film is formed of a transparent conductive film, ITO (alloy of indium oxide and tin oxide), alloy of indium oxide and zinc oxide ($In_2O_3$—ZnO), zinc oxide (ZnO), or the like can be used.

In addition, there is an insulator 404 (also referred to as a bank, a partition wall, a barrier, an embankment, or the like) covering the end portion of the first conductive film 403 (and the wiring 418). The insulator 404 can be made of an inorganic material (silicon oxide, silicon nitride, silicon oxynitride, or the like), a photosensitive or non-photosensitive organic material (polyimide, acryl, polyamide, polyimidamide, resist, or benzocyclobutene), or the layers formed by laminating these materials. This embodiment mode uses a photosensitive organic resin covered by the silicon nitride film. For example, when the positive photosensitive acrylic is used as the material of the organic resin, it is preferable that only the upper end portion of the insulator has the radius of curvature. In addition, the insulator may be either a negative type, which becomes insoluble in the etchant by the light, or a positive type, which becomes soluble in the etchant by the light.

In addition, the organic compound layer 405 is formed by a vapor deposition method, an ink jet method, or a coating method. In this embodiment mode, the organic compound layer is formed in a vapor deposition apparatus to obtain uniform film thickness. For example, when the vapor deposition method is used, the film is deposited in the film-forming chamber that is vacuum pumped so that the degree of vacuum is $5 \times 10^{-3}$ Torr (0.665 Pa) or less, preferably in the range of $10^{-4}$ to $10^{-6}$ Pa. At the deposition, the organic compound is vaporized by heating it in advance, and it is spattered toward the substrate by opening the shutter. Vaporized organic compound is spattered upward and deposited through an opening provided in a metal mask. In order to enhance the reliability, it is preferable to degas by means of vacuum heating (at temperatures ranging from 100 to 250° C.) just before forming the organic compound layer 405.

As shown in FIG. 5(B), the organic compound layer 405 is a laminated layer of HIL (a hole injecting layer), HTL (a hole transporting layer), EML (an emitting layer), ETL (an electron transporting layer), and EIL (an electron injecting layer) that are laminated in order from the anode side. Typically, CuPc is used as the HIL, α-NPD is used as the HTL, BCP is used as the ETL, and BCP:Li is used as the EIL. It is noted that the organic compound may have an inorganic material or may have a mixed material of the organic material and the inorganic material.

In addition, in the case of a full color display, the materials each showing the light emission of red (R), green (G), and blue (B) respectively as the organic compound layer (EL layer) 405 can be formed selectively by the vapor deposition method using respective deposition masks or by an ink-jetting method appropriately. Specifically, CuPc or PEDOT is used as the HIL, α-NPD is used as the HTL, BCP or $Alq_3$ is used as the ETL, and BCP:Li or $CaF_2$ is used as the EIL. In addition, for example, $Alq_3$ with dopant corresponding to each emitting color of R, G, and B (DCM or the like in the case of R, DMQD or the like in the case of G) doped may be used as EML. It is noted that the organic compound layer as mentioned above is not limited to the laminated-layer structure, and it may be a single-layer structure.

More specific laminated-layer structure of the organic compound layer is explained as follows. In the case of forming the organic compound layer 405 to show red light emission, for example after forming CuPc in 30 nm thick and α-NPD in 60 nm thick, the same mask is used to form $Alq_3$ with $DCM_2$ and rubrene added in 40 nm thick as a red light-emitting layer. After that, BCP is formed as the electron transporting layer in 40 nm thick, and then BCP with Li added is formed in 1 nm thick as the electron injecting layer. In addition, in the case of forming the organic compound layer showing green light emission, for example after forming CuPc in 30 nm thick and α-NPD in 60 nm thick, the same deposition mask is used to form $Alq_3$ with coumarin 545T added in 40 nm thick as a green light-emitting layer. After that, BCP is formed in 40 nm thick as the electron transporting layer, and then BCP with Li added is formed in 1 nm thick as the electron injecting layer. In addition, in the case of forming a layer including the organic compound layer showing blue light emission, for example after forming CuPc in 30 nm thick and α-NPD in 60 nm thick, the same mask is used to form bis [2-(2-hydroxyphenyl) benzoxazolate] zinc: $Zn(PBO)_2$ in 10 nm thick as an emitting layer. After that, BCP is formed in 40 nm thick as the electron transporting layer, and then BCP with Li added is formed in 1 nm thick as the electron injecting layer. Among the organic compound layers of these colors, CuPc and α-NPD common to all the colors can be formed all over the pixel portion. In addition, the mask can be shared among these colors. For example, after forming the red organic compound layer, the mask is moved to form the green organic compound layer. Then the mask is moved again to form the blue organic compound layer. It is noted that the order of the organic compound layer of each color to be formed may be set appropriately.

In addition, in the case of white light emission, the full color display may be achieved by providing a color filter or a color conversion layer separately. The color filter or the color conversion layer with respect to the white light emitting upward may be pasted to the first substrate after providing it to the second substrate. In addition, the color filter or the color conversion layer with respect to the white light emitting downward can be formed through the insulating film after forming the drain electrode (or the source electrode) 416. After that, because the insulating film and the second conductive film may be formed in order over the color filter or the color conversion layer, and the drain electrode (or the source electrode) 416 may be connected to the second conductive film through a contact formed in the insulating film.

It is possible to provide a light-emitting device having the highly homogeneous crystalline semiconductor film according to the galvanometer mirror or the polygon mirror of the present invention. As a result, it is possible to provide the light-emitting device in which the inhomogeneous laser beam irradiation (which leads to the display unevenness) is reduced in the display portion.

It is noted that the active matrix substrate of the present invention can be applied not only to the light-emitting device but also to the liquid crystal display device and another display device, and further to the semiconductor integrated circuit and CPU.

Embodiment Mode 5

The active matrix substrate manufactured by the present invention can be applied to various kinds of electronic instruments. As the electronic instrument, there are a portable information terminal (a mobile phone, a mobile computer, a mobile game machine, an electronic book, or the like), a video camera, a digital camera, a goggle type display, a display device, a navigation system, and the like. FIG. 6 shows specific examples of these electronic instruments.

Figures 6A, 6B:
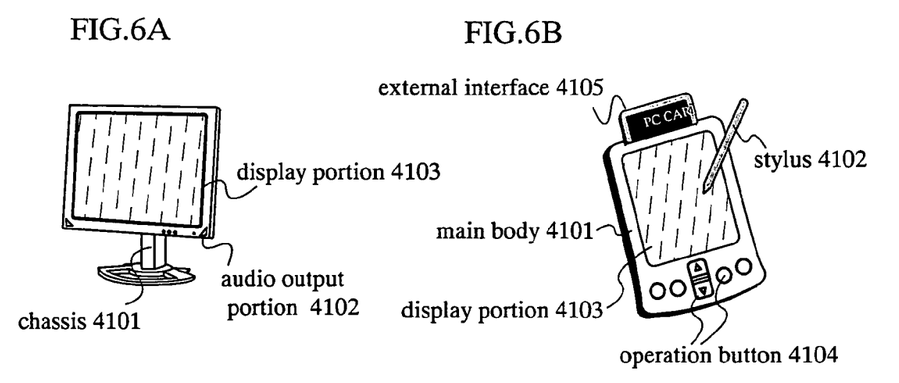
FIGS. 6A-6E are drawings showing the electronic instruments formed using the laser irradiation method of the present invention.

FIG. 6(A) is a display including a chassis 4001, an audio output portion 4002, a display portion 4003, and the like. The active matrix substrate formed by the present invention can complete the display portion 4003 having a liquid crystal material or a light-emitting element. The display device includes all the information display devices for a personal computer, for TV broadcast reception, for advertisement display, and the like.

FIG. 6(B) is a mobile computer including a main body 4101, a stylus 4102, a display portion 4103, an operation button 4104, an external interface 4105, and the like. The active matrix substrate formed by the present invention can complete the display portion 4103 having a liquid crystal material or a light-emitting element.

Figure 6C:
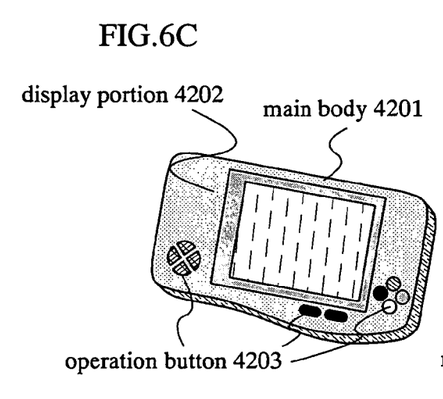
Figure 6D:
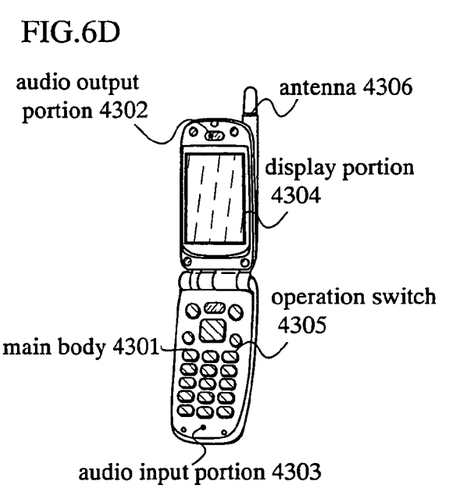

FIG. 6(C) is a game machine including a main body 4201, a display portion 4202, an operation button 4203, and the like. The active matrix substrate formed by the present invention can complete the display portion 4202 having a liquid crystal material or a light-emitting element. FIG. 6(D) is a mobile phone including a main body 4301, an audio output portion 4302, an audio input portion 4303, a display portion 4304, an operation switch 4305, an antenna 4306, and the like. The active matrix substrate formed by the present invention can complete the display portion 4304 having a liquid crystal material or a light-emitting element.

Figure 6E:
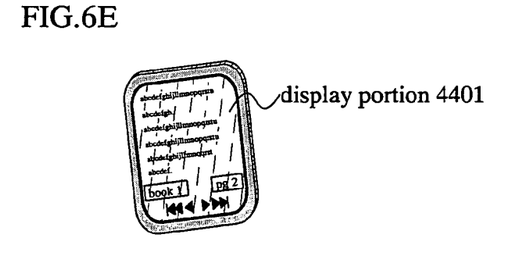

FIG. 6(E) is an electronic book reader including a display portion 4401 and the like. The active matrix substrate formed by the present invention can complete the display portion 4401 having a liquid crystal material or a light-emitting element.

As above, the present invention can be applied in a wide range, and can be applied to the electronic instruments in every field. In particular, it is possible to make the electronic instrument lightweight and thin when the flexible substrate is used as the insulating substrate of the active matrix substrate

Embodiment Mode 6

The present invention is applied not only to the CW beam but also to the output energy beam in a pulse oscillation (a pulsed beam, particularly referred to as a pulsed laser when using the laser as the light source).

The pulsed laser in the present invention is controlled so that a crystal grain grown continuously toward the scanning direction can be obtained by oscillating the laser light at such the oscillation frequency that the next laser light is irradiated within the period from the time the semiconductor film is melted with the laser light until the semiconductor film is solidified. In other words, the present invention can employ a pulsed beam in which the lower limit of an oscillation frequency is determined so that the period of a pulse oscillation (oscillation frequency) becomes shorter than the period from the time the semiconductor film is melted until the semiconductor film is completely solidified.

For example, the pulsed laser using the laser as the light source has an oscillation frequency of 10 MHz or more, frequency band is considerably higher than that of the pulsed laser to be used usually having an oscillation frequency in the range of several tens to several hundreds Hz.

It is said that it takes several tens ns to several hundreds ns to solidify the semiconductor film completely after the semiconductor film is irradiated with the laser light. With the pulsed laser light having such a high oscillation frequency applied thereto, it is possible to irradiate the next pulsed laser light within the period from the semiconductor film is melted by the laser light until the semiconductor film is solidified. Therefore, unlike the case using the conventional pulsed laser, the interface between the solid phase and the liquid phase can be moved continuously in the semiconductor film, thereby forming the semiconductor film having a crystal grain grown continuously toward the scanning direction. Specifically, it is possible to form an aggregation of crystal grains, each of which has a width ranging from approximately 10 to 30 µm in the scanning direction and a width ranging from approximately 1 to 5 µm in the direction perpendicular to the scanning direction, which is the crystal grain as large as that formed by the CW laser. It is also possible to form a semiconductor film having few crystal grain boundaries at least in the moving direction of TFT carriers by forming a crystal grain of a single crystal extending long along the scanning direction.

When the oscillation at frequency described above is possible, a beam emitted from a laser selected from the group consisting of an Ar laser, a Kr laser, an excimer laser, a $CO_2$ laser, a YAG laser, a $Y_2O_3$ laser, a $YVO_4$ laser, a YLF laser, a $YalO_3$ laser, a glass laser, a ruby laser, an alexandrite laser, a Ti: Sapphire laser, a copper vapor laser, and a gold vapor laser can be used as the pulsed beam.

For example, it is possible to use a $YVO_4$ laser having a energy of 2 W, a oscillation mode of TEM(00), a second harmonic (532 nm), an oscillation frequency of 80 MHz, and a pulse width of 12 ps. Moreover, a pulsed laser irradiation apparatus oscillating this laser can be used. In addition, the beam spot can be shaped into a rectangular spot having a size of 10 µm in its minor axis and 100 µm in its major axis on the surface of the semiconductor film by shaping the laser light through the optical system. When oscillation frequency is set to 80 MHz, the interface between the solid phase and the liquid phase can be moved continuously, thereby forming the crystal grain grown continuously toward the scanning direction. It is thus possible to form a semiconductor film having few crystal grain boundaries at least in the channel direction of TFT by forming a crystal grain of a single crystal extending long along the scanning direction.

In other words, in the case of using either continuous or the pulsed laser beam, uniform laser irradiation can be performed by the galvanometer mirror or the polygon mirror of the present invention.

What is claimed is:

1. A beam irradiation apparatus comprising:
   a laser oscillator for emitting an energy beam;
   a specular body;
   a shaft;
   a stage; and
   a lens between the specular body and the stage on the optical axis of the beam,
   wherein the specular body is fixed to a shaft so as to be set on an optical axis of the energy beam, and
   wherein the specular body fully rotates using the shaft as its center.

2. The beam irradiation apparatus according to claim 1, wherein the energy beam output continuously is emitted from the oscillator.

3. The beam irradiation apparatus according to claim 1, wherein the specular body has a plane surface or a curved surface.

4. The beam irradiation apparatus according to claim 1, wherein the shaft has a supporting bar in one end or in opposite ends thereof.

5. The beam irradiation apparatus according to claim 1, wherein the energy beam and the stage are relatively moved.

6. The beam irradiation apparatus according to claim 1, wherein the energy beam output continuously is a beam emitted from a laser selected from the group consisting of a $YVO_4$ laser, a YAG laser, a YLF laser, a $YAlO_3$ laser, and an Ar laser.

7. The beam irradiation apparatus according to claim 1, further comprising:
   an optical system for shaping the energy beam output continuously into linear,
   wherein the optical system is provided between the oscillator and the specular body on the optical axis of the beam.

8. The beam irradiation apparatus according to claim 1, wherein the lens is selected from an fθ lens and a telecentric fθ lens.

9. The beam irradiation apparatus according to claim 1, wherein the specular body is a galvanometer mirror.

10. A beam irradiation apparatus comprising:
    a laser oscillator for emitting an energy beam;
    a specular body;
    a shaft;
    a control apparatus;
    a stage; and
    a lens between the specular body and the stage on the optical axis of the beam,
    wherein the specular body is fixed to a shaft so as to be set on an optical axis of the energy beam, and
    wherein the specular body fully rotates using the shaft as its center
    wherein the rotation of the specular body is controlled by the control apparatus.

11. The beam irradiation apparatus according to claim 10, wherein the energy beam output continuously is emitted from the oscillator.

12. The beam irradiation apparatus according to claim 10, wherein the specular body has a plane surface or a curved surface.

13. The beam irradiation apparatus according to claim 10, wherein the shaft has a supporting bar in one end or in opposite ends thereof.

14. The beam irradiation apparatus according to claim 10, wherein the energy beam and the stage are relatively moved.

15. The beam irradiation apparatus according to claim 10, wherein the energy beam output continuously is a beam emitted from a laser selected from the group consisting of a $YVO_4$ laser, a YAG laser, a YLF laser, a $YAlO_3$ laser, and an Ar laser.

16. The beam irradiation apparatus according to claim 10, further comprising:
an optical system for shaping the energy beam output continuously into linear,
wherein the optical system is provided between the oscillator and the specular body on the optical axis of the beam.

17. The beam irradiation apparatus according to claim 10, wherein the lens is selected from an fθ lens and a telecentric fθ lens.

18. The beam irradiation apparatus according to claim 10, wherein the specular body is a galvanometer mirror.

19. A beam irradiation apparatus comprising:
a laser oscillator for emitting an energy beam;
a specular body;
a shaft;
a stage; and
wherein the energy beam and the stage are relatively moved,
wherein the specular body is fixed to a shaft so as to be set on an optical axis of the energy beam, and
wherein the specular body fully rotates using the shaft as its center.

20. The beam irradiation apparatus according to claim 19, wherein the energy beam output continuously is emitted from the oscillator.

21. The beam irradiation apparatus according to claim 19, wherein the specular body has a plane surface or a curved surface.

22. The beam irradiation apparatus according to claim 19, wherein the shaft has a supporting bar in one end or in opposite ends thereof.

23. The beam irradiation apparatus according to claim 19, wherein the energy beam output continuously is a beam emitted from a laser selected from the group consisting of a $YVO_4$ laser, a YAG laser, a YLF laser, a $YAlO_3$ laser, and an Ar laser.

24. The beam irradiation apparatus according to claim 19, further comprising:
an optical system for shaping the energy beam output continuously into linear,
wherein the optical system is provided between the oscillator and the specular body on the optical axis of the beam.

25. The beam irradiation apparatus according to claim 19, wherein the lens is selected from an fθ lens and a telecentric fθ lens.

26. The beam irradiation apparatus according to claim 19, wherein the specular body is a galvanometer mirror.

* * * * *